United States Patent [19]

Foster et al.

[11] Patent Number: 4,933,136
[45] Date of Patent: Jun. 12, 1990

[54] WATER REACTOR FUEL CLADDING

[75] Inventors: John P. Foster; Samuel G. McDonald, III, both of Monroeville Boro, Pa.

[73] Assignee: Westinghouse Electric Corp., Pittsburgh, Pa.

[21] Appl. No.: 230,734

[22] Filed: Aug. 10, 1988

Related U.S. Application Data

[63] Continuation of Ser. No. 709,865, Mar. 8, 1985, abandoned.

[51] Int. Cl.$^5$ .............................................. G21C 3/06
[52] U.S. Cl. .................................................. 376/416
[58] Field of Search ............... 376/416, 417, 414, 419, 376/457; 420/422

[56] References Cited

U.S. PATENT DOCUMENTS

| | | | |
|---|---|---|---|
| 3,243,350 | 3/1966 | Lustman et al. | 376/416 |
| 3,620,691 | 11/1971 | Rubel | 376/416 |
| 4,610,842 | 9/1986 | Vannesjo | 376/416 |
| 4,664,881 | 5/1987 | Ferrari et al. | 376/416 |
| 4,675,153 | 6/1987 | Boyle et al. | 376/416 |
| 4,735,768 | 4/1988 | Stehle et al. | 376/417 |
| 4,751,045 | 6/1988 | Foster et al. | 376/457 |
| 4,775,508 | 10/1988 | Sabol et al. | 376/416 |

FOREIGN PATENT DOCUMENTS

| | | | |
|---|---|---|---|
| 1168769 | 6/1984 | Canada | 376/416 |
| 1198231 | 12/1985 | Canada . | |
| 0121204 | 10/1984 | European Pat. Off. . | |
| 1589458 | 4/1970 | Fed. Rep. of Germany . | |
| 3310054 | 10/1983 | Fed. Rep. of Germany . | |
| 0134552 | 8/1982 | Japan | 376/416 |
| 0058389 | 4/1984 | Japan | 376/416 |
| 2104711 | 3/1983 | United Kingdom . | |
| 2119559 | 11/1983 | United Kingdom . | |

OTHER PUBLICATIONS

"The Development of the Zircaloys", Kass, ASTM Special Technical Publication No. 368, 1964, pp. 3-27.
"Zirconium and Zirconium Alloy Ingots for Nuclear Application", ASTM B350-80, 11/80, pp. 229-232.

Primary Examiner—Brooks H. Hunt
Assistant Examiner—Daniel Wasil

[57] ABSTRACT

This invention describes a tubular water reactor fuel cladding having an outer cylindrical layer composed of a conventional zirconium base alloy. Bonded to the outer cylindrical layer is a second layer composed of an alloy selected from the group of zirconium base alloys consisting of: about 0.19 to 0.6 wt. % tin, about 0.19 to 0.5 wt. % iron, and about 100 to 700 ppm oxygen; or about 0.4 to 0.6 wt. % tin, about 0.1 to 0.3 wt. % iron, about 0.1 to 0.3 wt. % nickel, and about 100 to 700 ppm oxygen.

17 Claims, 1 Drawing Sheet

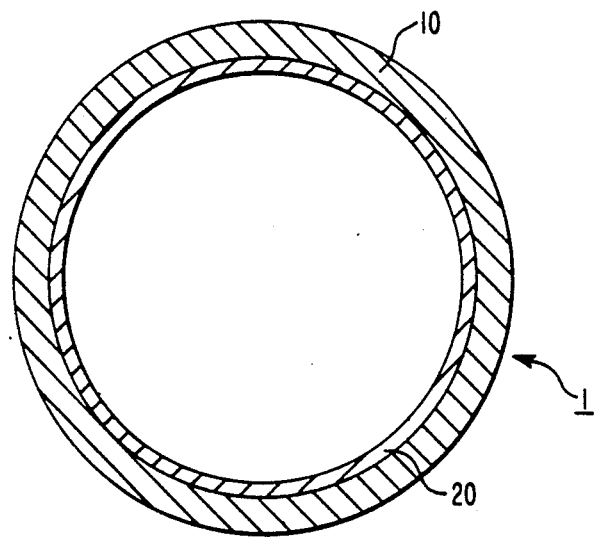

WATER REACTOR FUEL CLADDING

This application is a continuation of application Ser. No. 709,865, filed Mar. 8, 1985 now abandoned.

BACKGROUND OF THE INVENTION

The present invention pertains to the fields of zirconium base alloy fuel cladding for use in pressurized water and boiling water reactors. It is especially concerned with having properties which minimize the adverse effects of pellet-clad interaction (PCI) in water reactor fuel elements.

The use of cladding tubes made entirely of a high zirconium alloy has been the practice in the water reactor industry. Examples of common alloys used are Zircaloy-2 and Zircaloy-4. These alloys were selected based on their nuclear properties, mechanical properties, and high-temperature aqueous corrosion resistance.

The history of the development of Zircaloy-2 and 4, and the abandonment of Zircaloy-1 and 3, is summarized in: Stanley Kass, "The Development of the Zircaloys," published in ASTM Special Technical Publication No. 368 (1964) pp. 3–27. This article is hereby incorporated by reference. Also of interest with respect to Zircaloy development are U.S. Pat. Nos. 2,772,964; 3,097,094; and 3,148,055. These patents are hereby incorporated by reference.

Most commercial chemistry specifications for Zircaloy-2 and 4 conform essentially with the requirements published in ASTM B350-80, (for alloy UNS No. R60802 and R60804, respectively) for example. In addition to these requirements, the oxygen content for these alloys is required to be between 900 to 1600 ppm but typically is about 1200 ±200 ppm for fuel cladding applications. ASTM B350-80 is hereby incorporated by reference.

It has been a common practice to manufacture Zircaloy cladding tubes by a fabrication process involving: hot working an ingot to an intermediate size billet or log; beta solution treating the billet; machining a hollow billet; high temperature alpha extruding the hollow billet to a hollow cylindrical extrusion; and then reducing the extrusion to substantially final size cladding through a number of cold pilger reduction passes, having an alpha recrystallization anneal prior to each pass. The cold worked, substantially final size cladding is then final annealed. This final anneal may be a stress relief anneal, partial recrystallization anneal or full recrystallization anneal. The type of final anneal provided is selected based on the designer's specification for the mechanical properties of the fuel cladding.

One problem that has occurred in the use of fuel rods utilizing the aforementioned cladding has been the observation of cracks emanating from the interior surface of the cladding which is placed under additional stress by contact with a fractured, thermally expanding oxide fuel pellet. These cracks sometimes propagate through the wall thickness of the cladding destroying the integrity of the fuel rod and thereby allowing coolant into the rod and radioactive fission products to contaminate primary coolant circulating through the reactor core. This cracking phenomena is generally believed to be caused by the interaction of irradiation hardening, mechanical stress, and fission products, producing an environment conducive to crack initiation and propagation in zirconium alloys.

Zircaloy fuel cladding tubes having a zirconium layer bonded to their inside surface have been proposed as being resistant to the propagation of cracks initiated at the interface between the fuel pellet and cladding during water reactor operation. Examples of these proposals are provided by U.S. Pat. Nos. 4,045,288; 4,372,817; 4,200,492; and 4,390,497; and United Kingdom Patent Application No. 2,104,711A. These patents are hereby incorporated by reference.

The zirconium liners of the foregoing patents have been selected because of their resistance to PCI crack propagation without consideration of their resistance to aqueous corrosion. If the cladding should breach in the reactor, allowing coolant inside the cladding, it is expected that the aqueous corrosion resistance of the liner will be vastly inferior to that of the high zirconium alloy making up the bulk of the cladding. Under these conditions the liner would be expected to completely oxidize, thereby becoming useless, relatively rapidly, while leading to increased hydride formation in the zirconium alloy portion of the cladding, thereby compromising the structural integrity of the zirconium alloy. This degradation of the cladding could lead to gross failure with significantly higher release of uranium and radioactive species to the coolant.

The art has sought to address this aqueous corrosion resistance problem by burying the zirconium layer of the aforementioned patents between layers of conventional zirconium alloys having high aqueous corrosion resistance or by substituting a dilute zirconium alloy for the internally exposed zirconium layer. Examples of these designs are described in United Kingdom Patent Application No. 2,119,559. Despite these efforts there continues to be a need for water reactor fuel cladding having the excellent aqueous corrosion resistance of conventional zirconium alloys on both its inside diameter and outside diameter surfaces, while having improved PCI crack propagation resistance compared to the conventional Zircaloy-2 and Zircaloy-4 fuel claddings.

SUMMARY OF THE INVENTION

Applicants have now designed a tubular fuel cladding that has excellent inside and outside surface aqueous corrosion resistance and provides a significant improvement in PCI crack propagation resistance compared to conventional cladding made entirely of Zircaloy-4 or Zircaloy-2. In accordance with the present invention, a water reactor fuel cladding tube is provided having an outer cylindrical layer of a first zirconium alloy having high strength and excellent aqueous corrosion resistance. Preferably this first zirconium alloy is selected from the conventional zirconium alloys now in commercial use, and most preferably is either Zircaloy-2 or Zircaloy-4. Metallurgically bonded to the outer layer is an inner cylindrical layer composed of a second zirconium alloy. This second zirconium alloy is selected from the group consisting of the alloys having the compositions shown in Table I.

TABLE I

|    | X              | Y            |
|----|----------------|--------------|
| Sn | 0.19–0.6 wt. % | 0.4–0.6 wt. % |
| Fe | 0.19–0.5 wt. % | 0.1–0.3 wt. % |
| Ni | impurity       | 0.1–0.3 wt. % |
| O  | 100–700 ppm    | 100–700 ppm  |

TABLE I-continued

| | X | Y |
|---|---|---|
| Zr | Balance* | Balance* |

*except for impurities (including oxygen and nickel) whose sum is less than 2000 ppm.

Within Alloy X are two preferred compositions as follows:

Alloy X1 containing 0.19 to 0.3 wt.% tin, and 0.19 to 0.3 wt.% iron; and Alloy X2 containing 0.4 to 0.6 wt.% tin, and 0.3 to 0.5 wt.% iron.

Preferably the oxygen content of the above alloys is between 100 and 500 ppm.

Also in accordance with the present invention, the inside and outside diameter surfaces of the fuel cladding tube are preferably characterized by essentially black and adherent oxide films after 24 hours exposure to a 500° C., 1500 psi steam test.

The above and other aspects of the present invention will be further apparent upon review of the figure in conjunction with the following description of the invention.

BRIEF DESCRIPTION OF THE DRAWING

The figure shows a transverse cross section through an elongate fuel cladding tube in accordance with the present invention.

DETAILED DESCRIPTION OF THE INVENTION

As shown in the figure, and in accordance with the present invention, a composite fuel cladding tube 1 is provided having two concentric layers, each composed of a different zirconium base alloy. The outer layer 10 is composed of a conventional high strength zirconium base alloy known for its excellent corrosion resistance in aqueous environments. This first alloy may be either Zircaloy-2 or Zircaloy-4, for example. The Zircaloy-2 or 4 utilized preferably conforms to the chemistry specification published in ASTM B350-80 Table 1 for UNS 60802 (Zircaloy2) or UNS 60804 (Zircaloy-4). In addition the oxygen content of these alloys should be between 900 and 1600 ppm.

Metallurgically bonded to, and located within, the outer layer 10 is a second cylindrical layer 20 having one of the compositions shown in Table I. The inner layer has been provided to give the fuel cladding tube improved resistance to the propagation of PCI related cracks in pile. The alloys selected for this layer have minimal amounts of tin and iron (and nickel in the case of alloy Y) in order to assure that the aqueous corrosion resistance of the inner layer is at least substantially the same as the corrosion resistance of the Zircaloy-2 or 4 outer layer. The upper limits provided on these alloying elements assures that the inner layer material maintains sufficient ductility during in pile usage to stop the propagation of PCI related cracks. Alloy X1 is preferred over Alloy X2 and Alloy Y because it has the lowest content of alloying elements, but yet has excellent corrosion resistance.

The oxygen content of the second layer alloy is between 100 and 700 ppm. As oxygen increases, the hardness of the inner layer alloy increases and is believed to adversely affect the ability of the layer to resist PCI crack propagation in pile. Oxygen is therefore kept below about 700 ppm and more preferably 500 ppm. The lower limit in oxygen content has been selected on the basis that any further improvement in PCI performance obtained by decreasing the oxygen further is believed to be limited and therefore cannot be justified in view of the significant additional costs involved in reducing oxygen below 100 ppm.

While it has been noted the total impurities in the inner layer are maintained below 2000 ppm, it is preferred that they be below 1500 ppm and that individual impurity contents be within the maximum levels specified by ASTM B350-80 Table 1 UNS R60001 where applicable. ASTM B350-80, in its entirety, is hereby incorporated by reference. Electron beam melting of the zirconium starting material to be used in making the inner layer alloy, may be performed to reduce total impurity content.

The thickness of the inner layer 20 is less than the thickness of the outer layer 10, and is preferably about 0.002 to about 0.006 and more preferably about 0.003-0.005. The outer layer 10 forms the bulk of the cladding and provides the cladding with its mechanical properties. The required thickness of this outer layer may thus be determined by conventional procedures used by those of ordinary skill in the art of nuclear fuel element design. Complete metallurgical bonding between the inner and outer layers is preferably obtained by an elevated temperature coextrusion step.

The coextrusion is then reduced to final size using known cold pilgering and annealing processes utilized to fabricate cladding tubes made completely of Zircaloy. Conventional Zircaloy lubricants, cleaning, straightening, and surface finishing techniques may be used in conjunction with any of the processes, both conventional and new, described in copending application Serial Nos. 343,788 and 343,787, both filed on Jan. 29, 1982, and in U.S. Pat. No. 4,450,016, which are all hereby incorporated by reference. All of the foregoing fabrication processes will result in complete and continuous metallurgical bonding of the layers, except for minor, insignificant areas of unavoidable bond-line contamination.

Beta treatment, either by laser or induction heating, while not required to practice the present invention, is preferred. When used, such treatment would be performed either between the next to last and last cold pilgering passes preferably as a surface treatment (as described in U.S. patent application Ser. No. 343,788) or just prior to the next to last cold pilger pass preferably as a through wall beta treatment. After beta treatment, all intermediate, as well as the final anneals, should preferably be performed below about 600° C. and more preferably at or below about 550° C. These low temperature anneals are used to preserve the enhanced corrosion resistance imparted by the beta treatment.

Most preferably, the aqueous corrosion resistance of the outer layer and inner layer are characterized by a grey or substantially black, adherent corrosion film and a weight gain of less than about 200 mg/dm$^2$, and more preferably less than about 100 mg/dm$^2$ after a 24-hour, 500° C., 1500 psi steam test.

Whether or not surface beta treatment has been used, the final anneal, after the final cold pilgering pass, may be one in which the zirconium alloy inner layer is stress relieved (i.e. without significant recrystallization), partially recrystallized, or fully recrystallized. Where a full recrystallization final anneal is performed, the resulting average grain size is no larger than about ¼, and more preferably between about 1/10 and 1/30, the inner layer wall thickness. The Zircaloy outer layer has been at least stress relief annealed. After the final anneal, conventional Zircaloy tube cleaning, straightening, and finishing steps are performed.

The invention will be further clarified by the following example which is intended to be purely exemplary of the present invention.

An alloy having the ingot composition shown in Table II was melted by consumable electrode vacuum arc melting the required alloying additions with commercially available zirconium. Arc melting was performed twice.

It should be understood that the cladding chemistry requirements set forth in this application may be met by performing chemical analyses at the ingot stage of manufacture for alloying elements and impurities, and subsequently, at an intermediate stage of manufacture, such as near the coextrusion stage, for the interstitial elements, oxygen, hydrogen, and nitrogen. Chemical analysis of the final size cladding is not required.

TABLE II

| Composition of Inner Layer Ingot* | |
|---|---|
| Sn | .19–.20 w/o |
| Fe | .19 w/o |
| Al | 74–70 ppm |
| B | 0.2 ppm |
| Cd | <0.2 ppm |
| C | 80–90 ppm |
| Cl | 12–16 ppm |
| Co | <10 ppm |
| Cu | <25 ppm |
| Cr | <100 ppm |
| Hf | 38–35 ppm |
| Mn | <25 ppm |
| Mo | <25 ppm |
| Ni | <25 ppm |
| N | 21–22 ppm |
| O | 615–721 ppm |
| Si | 56–49 ppm |
| Ti | <25 ppm |
| W | <50 ppm |
| U | 1.3–1.5 ppm |

*All results based on two analyses, one at the top and one at the bottom of the ingot. Where no range is shown, analyses at top and bottom were identical.

The resulting ingot was about 8 inches in diameter by about 42 inches in length. The ingot was machined to a cylindrical hollow having an outside diameter of about 7.7 inches and an inside diameter of about 1.65 inches. The hollow was then heated to about 1000° F. and immediately extruded to a tube hollow having an outside diameter of about 3 inches and an inside diameter of about 1.65 inches. This hollow was then used to form the inner layer starting component. While not used in this example, it is preferred that the inner layer starting material receive a beta solution treatment, preferably prior to coextrusion.

A tubular Zircaloy-2 starting component for the outer layer was then fabricated from a triple arc melted (vacuum consumable electrode) 26 inch diameter ingot having the alloying element chemistry shown in Table III. The ingot was fabricated by conventional forging to a 7 inch diameter round and then beta solution treated. The 7 inch round was then machined to a hollow cylinder having an outside diameter of about 6.7 inches and an inside diameter of about 2.9 inches.

TABLE III

| Zircaloy-2 Ingot Alloy Analysis | |
|---|---|
| | (weight percent) |
| Sn | 1.52–1.60 |
| Fe | .15–.16 |
| Cr | .10–.11 |
| Ni | .05–.06 |
| Fe + Cr + Ni | .30–.33 |
| O | .107–.121 |
| Zr | Balance except for impurities |

The inside diameter of the outer layer starting component and outside diameter surface of the inner layer starting component were machined as needed to provide a close fit between the components when nested inside of each other. After machining, the components were cleaned and pickled to remove surface contamination from the surfaces to be bonded. The components were then nested inside of each other and the annulus formed at the interface of the adjacent components is vacuum electron beam welded shut, such that a vacuum is maintained in the annulus after welding both ends of the nested components. At this stage, the unbonded tube shell assembly was heated to about 1100° F. and extruded to a tube shell having about a 2.5 inch outside diameter and a wall thickness of about 0.43 inch. The inside diameter was then honed, the outside diameter grit blasted. The tube shell was then cleaned and pickled, vacuum annealed for 2 to 3 hours at about 675° C., and then recleaned and pickled.

In the preceding manner three coextruded tube shells were produced from the two starting ingots. The results of chemical analyses performed on the coextruded tube shells are shown in Table IV.

TABLE IV

| | Coextrusion Chemistry | | |
|---|---|---|---|
| Coextrusion | A | B | C |
| Inner Layer N | 38 | 19 | 27 |
| Inner Layer O | 586 | 629 | 698 |
| Outer Layer H | <12 | <12 | <12 |
| Outer Layer N | 45 | 54 | 53 |
| Outer Layer O | 1120 | 1210 | 1120 |

Coextrusion A was then reduced by cold pilgering according to the following schedule:

Step 1: Cold pilger to 1.65 inch outside diameter and 0.30 inch wall thickness.

Step 2: Vacuum anneal at about 1250° F. for about 3.5 hours at temperature.

Step 3: Cold pilger to 1.0 inch outside diameter and 0.16 inch wall thickness.

Step 4: Induction through wall beta quench using a water spray quench.

Step 5: Cold pilger to 0.65 inch outside diameter and 0.0075 inch wall thickness.

Step 6: Vacuum anneal at about 1200° F. for about 3.5 hours at temperature.

Step 7: Cold pilger to about 0.482 outside diameter and about 0.031 inch wall thickness.

Step 8: Final anneal.

Samples of the tubing produced by step 7 were final annealed in step 8 according to one of the three following schedules: 8.1, 8.2 or 8.3.

8.1 Final vacuum anneal at about 1100° F. for about 5 hours at temperature. This treatment fully recrystallized both the outer and inner layers and produced a grain size in the inner layer estimated to be about ASTM grain size number 11 (i.e. approximately 0.0003 inches in diameter).

8.2 Final vacuum anneal at about 900° F. for 5 hours at temperature. This treatment produced a fully recrystallized inner layer and a stress relieved (i.e. no recrystallization evident by optical metallographic examination) outer layer. The inner layer had a Knoop Hardness number of about 160 KHN (100 gm. load) and an ASTM grain size number of about 11.7 (i.e. approximately 0.00024 inches in diameter).

8.3 Final vacuum anneal at about 880° F. for about 5 hours at temperature. This treatment partially recrystallized the inner layer and stress relieved the outer layer. The inner layer had a hardness of about 190 KHN (100 gm. load) and was roughly estimated to be about 75% recrystallized based on optical metallography.

Interspersed through the above fabrication procedures are conventional cleaning and pickling steps as needed to remove surface contamination and maintain surface quality. The final inner layer thickness will be about 0.003 inches after final pickling.

The finished lined cladding according to the present invention is then loaded with fissile fuel material. Preferably the fuel material used is in the form of cylindrical pellets, and may have chamfered edges and/or concavedly dished ends. Preferably these pellets are mainly composed of $UO_2$ and are about 95% dense. The uranium in these pellets may be enriched or natural. These pellets may also contain a burnable absorber such as gadolinia or a boron compound. The resulting fuel element may be one of any of the known pressurized water or boiling water reactor designs, preferably with a standard pressurized helium atmosphere inside of the hermetically sealed cladding.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

We claim:

1. A nuclear reactor fuel element cladding tube comprising:
    an outer cylindrical layer of a first zirconium alloy selected from the group consisting of Zircaloy-2 and Zircaloy-4;
    an inner cylindrical layer of a second zirconium alloy consisting essentially of
      about 0.19 to 0.6 wt.% tin,
      about 0.19 to less than 0.5 wt.% iron,
      about 100 to 700 ppm oxygen, less than 2000 ppm total impurities, and the remainder essentially zirconium;
    said inner layer characterized by aqueous corrosion resistance substantially the same as said first zirconium alloy;
    said inner layer characterized by improved resistance to PCI crack propagation under reactor operating conditions compared to said first zirconium alloy and substantially the same PCI crack propagation resistance compared to unalloyed zirconium;
    and said inner cylindrical layer is metallurgically bonded to said outer layer.

2. A nuclear reactor fuel element cladding tube according to claim 1 wherein said second zirconium alloy contains
    about 0.19 to 0.3 wt.% tin,
    and about 0.19 to 0.3 wt.% iron.

3. A nuclear reactor fuel element cladding tube comprising:
    an outer cylindrical layer of a first zirconium alloy selected from the group consisting of Zircaloy-2 and Zircaloy-4;
    an inner cylindrical layer of a second zirconium alloy consisting essentially of
      about 0.1 to 0.6 wt.% tin,
      about 0.1 to 0.3 wt.% iron,
      about 0.1 to 0.3 wt.% nickel,
      about 100 to 700 oxygen, less than 2000 ppm total impurities, and the remainder essentially zirconium.

4. The fuel element cladding tube according to claim 1 having a corrosion resistance characterized by a weight gain of less than 200 mg/dm$^2$ and essentially black and adherent oxide films on said inner and said outer layers after a 24-hour exposure to a 500° C. steam test.

5. The fuel element cladding tube according to claim 2 having a corrosion resistance characterized by a weight gain of less than 200 mg/dm$^2$ and essentially black and adherent oxide films on said inner and said outer layers after a 24-hour exposure to a 500° C. steam test.

6. The nuclear reactor fuel element cladding tube according to claim 3 having a corrosion resistance characterized by a weight gain of less than 200 mg/dm$^2$ and essentially black and adherent oxide films on said inner and said outer layers after a 24-hour exposure to a 500° C. steam test.

7. The nuclear reactor fuel element cladding tube according to claim 1 wherein said oxygen content of said second zirconium alloy is about 100 to 500 ppm.

8. The nuclear reactor fuel element cladding tube according to claim 2 wherein said oxygen content of said second zirconium alloy is about 100 to 500 ppm.

9. The nuclear reactor fuel element cladding tube according to claim 3 wherein said oxygen content of said second zirconium alloy is about 100 to 500 ppm.

10. The nuclear reactor fuel element cladding tube according to claim 1 wherein said second zirconium alloy contains
    about 0.4 to 0.6 wt.% tin, and about 0.3 to less than 0.5 wt.% iron., 11. The nuclear reactor fuel element cladding tube according to claim 1 wherein said second zirconium alloy is characterized by a stress relieved microstructure.

12. The nuclear reactor fuel element cladding tube according to claim 1 wherein said second zirconium alloy is characterized by a partially recrystallized microstructure.

13. The nuclear reactor fuel element cladding tube according to claim 7 having less than 1500 ppm total impurities.

14. The nuclear reactor fuel element cladding tube according to claim 8 having less than 1500 ppm total impurities.

15. The nuclear reactor fuel element cladding tube according to claim 9 having less than 1500 ppm total impurities.

16. The nuclear reactor fuel element cladding tube according to claim 10 wherein said oxygen content of said second zirconium alloy is about 100 to 500 ppm.

17. The nuclear reactor fuel element cladding tube according to claim 16 having less than 1500 ppm total impurities.

* * * * *